Dec. 27, 1960    H. J. SKIDMORE    2,966,082
METHOD OF CONVERTING A FREE-SPINNING NUT INTO A PREVAILING
TORQUE LOCK NUT, AND APPARATUS THEREFOR
Filed Nov. 25, 1957

INVENTOR.
HAROLD J. SKIDMORE
BY Benjamin W. Colman
ATTORNEY

United States Patent Office 2,966,082
Patented Dec. 27, 1960

2,966,082

METHOD OF CONVERTING A FREE-SPINNING NUT INTO A PREVAILING TORQUE LOCK NUT, AND APPARATUS THEREFOR

Harold J. Skidmore, 24940 Waycross Road, Smithfield Township, Oakland County, Mich.

Filed Nov. 25, 1957, Ser. No. 698,753

2 Claims. (Cl. 81—10)

This invention relates to a method of and apparatus for converting a free spinning nut into a prevailing torque lock nut, after the nut has been threaded upon a stud or bolt.

The invention here disclosed and claimed is a continuation in part of my application Serial No. 698,752 filed simultaneously with this application on November 25, 1957 and entitled "Lock Nut." Application No. 698,752 issued as U.S. Patent No. 2,923,339 on February 2, 1960.

The invention involves a lock nut having a body on whose outer surface, other than the ends of the body, are formed one or more exterior projections. These projections may be formed exteriorly on the side walls of a nut body having a plurality of walls, or they may be formed exteriorly on the wall of a crown extension of the nut body. The projections are preferably formed by forging as the nut blank is being formed into shape prior to tapping, or the projections may be applied by welding on the side walls or crown wall, or they may be formed according to any other suitable method or in any other suitable manner.

As described in the above-referred to application, the nut having these projections on its exterior surface, other than the ends thereof, is formed into a prevailing torque lock nut by squeezing the projections into the wall of the nut, whereby the thread portions adjacent to and in the path of the inwardly forced projections are displaced into the bore of the nut.

The instant invention provides for squeezing the projections into the wall of the nut after the nut has been freely spun onto a bolt or stud and firmly wrenched into seating position. The projections are then squeezed into the wall of the nut, displacing the thread portions adjacent to and in the path of the inwardly forced projections to apply a greater locking frictional resistance to turning upon the stud threads.

It is an object of the invention to provide a free spinning nut having external projections on the outer wall surface of a nut body, other than at the ends thereof. It is another object to provide a method for wrenching such a nut into seating position on a stud or bolt and thereafter to force the projections into the wall of the nut, causing displacement of the threads adjacent to and in the path of the inwardly forced projections, and to increase the locking effect upon the stud threads. A further object is to provide a single tool to perform this operation, which wrenches the nut into seating position and thereafter applies a squeezing action radially of the nut to force the external projections on the outer wall surface into the nut wall.

These and additional objects of the invention and features of construction will become more apparent from the description of the invention given below, in which the terms are used for purposes of description and not of limitation.

Referring now to the drawing annexed hereto and forming an integral part of this specification, and in which—

Figure 1:
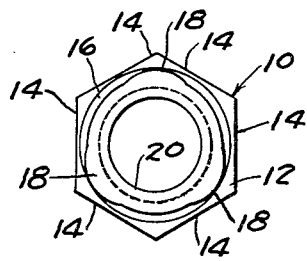
Fig. 1 is a plan view of a crown type free spinning nut having projections on the outer crown wall.
Figure 3:
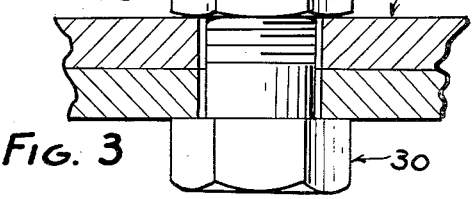
Fig. 3 is an elevational view partially in section, showing the free spinning nut threaded upon a bolt into full seating position.
Figure 2:
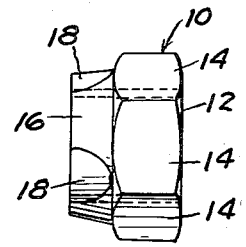
Fig. 2 is a side elevational view of the nut of Fig. 1.
Figure 4:
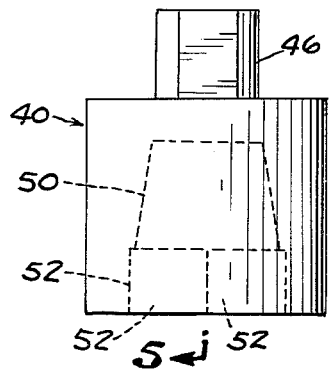
Fig. 4 is a side elevational view of a tool used for wrenching the nut upon a bolt and for driving in the projections on the crown wall.

As shown in the several views of the drawing, the crown nut 10 is provided with a body 12 having side walls 14 and a tapered cylindrical crown 16 at one end.

On the crown wall are arranged one or more external projections 18, preferably formed thereon by forging when the nut blank is formed into shape and before tapping the bore of the body. The projections 18 are preferably spaced at equal intervals about the perimeter of the crown 16. It will be observed that the projections provide a heavier wall thickness where they are located than in adjacent areas of the crown wall. Thus, when the projections are squeezed and forced into the wall, these areas become more dense and the crown wall acquires increased resiliency. At the same time the thread portions adjacent to and in the path of the inwardly forced projections are displaced inwardly of the bore of the nut body.

The nut 10 is provided with threads 20, uniformly cut throughout the length of the bore, making the nut free-spinning in character. When the projections 18 are forced into the crown wall, the threads 22 are inwardly displaced to apply an increased locking effect, or frictional resistance to turning, on the stud threads.

The nut 10 is threaded upon the stud 30, having threads 32 uniformly cut thereon, and seated against the work W, by a tool 40 which may be driven in any suitable manner and by conventional means, such as by a hydraulic wrench 42. The tool 40 is provided with a body 44 terminating at one end in a shank insert 46. Tool body 44 is formed at its opposite end with a tapered counterbore 50 corresponding to the taper of crown wall 16, and a wrenching section with flats 52 corresponding to the width and diameter of the nut flat side walls.

Figure 6:
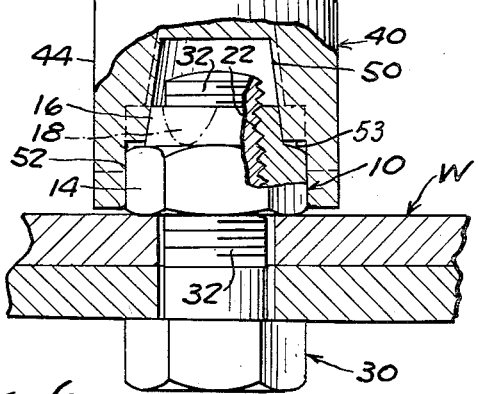
Fig. 6 is a vertical sectional view showing the tool applied to a nut when driving in the projections on the crown wall.
Figure 5:
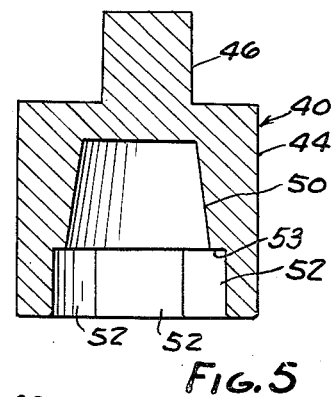
Fig. 5 is a vertical sectional view taken on the line 5—5 of Fig. 4.

As shown particularly in Fig. 6, the tool 40 is held in the socket 54 of a wrench 42. The flats 52 are first placed over the side walls 14 of the nut 10 and the nut threaded down into seating position against the work W on the stud threads 32. The initial position of the tool and flats 52 is preferably that shown in broken lines, prior to engagement of the tapered counterbore 50 with the projections 18. When the nut is firmly seated, the tool 40 is forced downwardly upon the nut 10, so that the tapered counterbore 50 is forced upon the projections 18 squeezing them into the crown wall 16, as shown in full lines. Tool counterbore 50 is of a size to avoid contact with the protruding end of the stud 30 at any stage of operation in securing the nut 10 on stud 30. The stop face 53 is provided at the lower end of the counterbore 50 to limit the axial movement of the tool body, the stop face being positioned to come into engagement with the upper end of the nut body adjacent the nut crown 16 as a stop when the counterbored portion is fully seated upon the crown wall surface.

As the projections 18 are squeezed into the crown wall, the metal immediately in the path of the applied force and closely adjacent thereto increases in density and the thread portions 22 adjacent to and in the path of the projections are displaced inwardly of the bore of the nut and forced closely upon the stud threads 32, increasing the locking effect of the nut.

Although the drawing shows the projections 18 forced fully into the crown wall 16, Fig. 6, so that the outer surface of the wall is smoothly tapered cylindrical in character, it is to be understood that the projections may be driven into the wall only partially, a portion of the projections remaining exteriorly of the tapered wall. In such event, the density of the crown wall in the areas of the inwardly forced projections is increased to a lesser extent than if the projections were forced in flush with the tapered crown, i.e. fully. Also, the displacement of the thread portions in the path of the inwardly forced projections is measurably less upon partial ingress of the projections than when fully driven into the crown wall 16.

It will be easily recognized and understood that the tool 40 confines the tapered cylindrical crown wall 16 within the counterbore 50. Thus, there is no distortion of the crown wall as the projections 18 are forced inwardly of the wall. Another desirable resultant is that the thread portions 22 in the path of the inwardly forced projections 18 are directly radially upon the stud threads 32. There is no sidewise displacement of these thread portions because the entire crown wall is held concentric within the tool counterbore 50.

The tool holder 42 which is shown only fragmentarily may be hydraulically or electrically driven, or driven by any other suitable means. Although the holder 42 is shown with a female socket 54 to receive the male shank insert 46, it will be understood by persons skilled in the art to which the invention pertains that the male element can be mounted upon the tool holder 42 and the female socket be arranged in the tool 40, i.e. reversed, without modifying the invention here disclosed.

Means for driving the tool 40 axially as well as rotating the same is preferably disposed in or in conjunction with the tool holder 42, whereby the counterbore 50 is driven axially upon the projections 18 and the crown wall 16 of the nut 10, after it has been wrenched into full seating position upon the work W.

The tool 40 is preferably positioned initially about the position shown in broken lines in Fig. 6 for spinning the nut 10 upon the stud or bolt 30. When fully seated, the tool 40 is driven axially into the position shown in full lines.

Having described the invention in its simplest terms, it is to be clearly understood that the features of construction may be changed and varied in greater or lesser degree without departing from the essence of the invention.

I claim:

1. In a wrenching tool, for a lock nut having a tapered cylindrical crown wall extension at one end thereof provided with exteriorly formed projections on the outer surface of said wall, adapted to be rotatively driven and axially impelled, a body having a lower socket portion at one end thereof provided with side walls adapted to engage said nut at its side walls during rotative movement of said tool for threading said nut into seating position upon a stud, and a taper counterbored portion integrally formed with, in fixed relation and to communicating with said socket portion, said counterbored portion adapted to seat fully upon said crown wall when said tool body is impelled axially of said nut so as to drive said projections radially into said crown wall surface, the depth of said socket portion being of a measure such that when said counterbored portion is impelled axially upon said projections into fully seated position upon said tapered crown wall, the digital end face of said tool body at said socket portion lies above the plane of the bottom face of said nut.

2. The construction defined in claim 1, and in which a stop face is provided between said counterbored portion and said socket portion to limit the axial movement of said tool body upon said lock nut.

References Cited in the file of this patent

UNITED STATES PATENTS

| 1,775,055 | Tarbox | Sept. 2, 1930 |
| 1,925,714 | Crist | Sept. 5, 1933 |
| 2,301,438 | Moeller | Nov. 10, 1942 |
| 2,375,741 | Dibner | May 8, 1945 |
| 2,513,780 | Baxter | July 4, 1950 |
| 2,538,343 | Van Winkle | Jan. 16, 1951 |
| 2,760,393 | Stough | Aug. 28, 1956 |